July 15, 1958
T. R. BRUNSON
2,843,723
WELDING APPARATUS
Filed Nov. 5, 1956
2 Sheets-Sheet 1
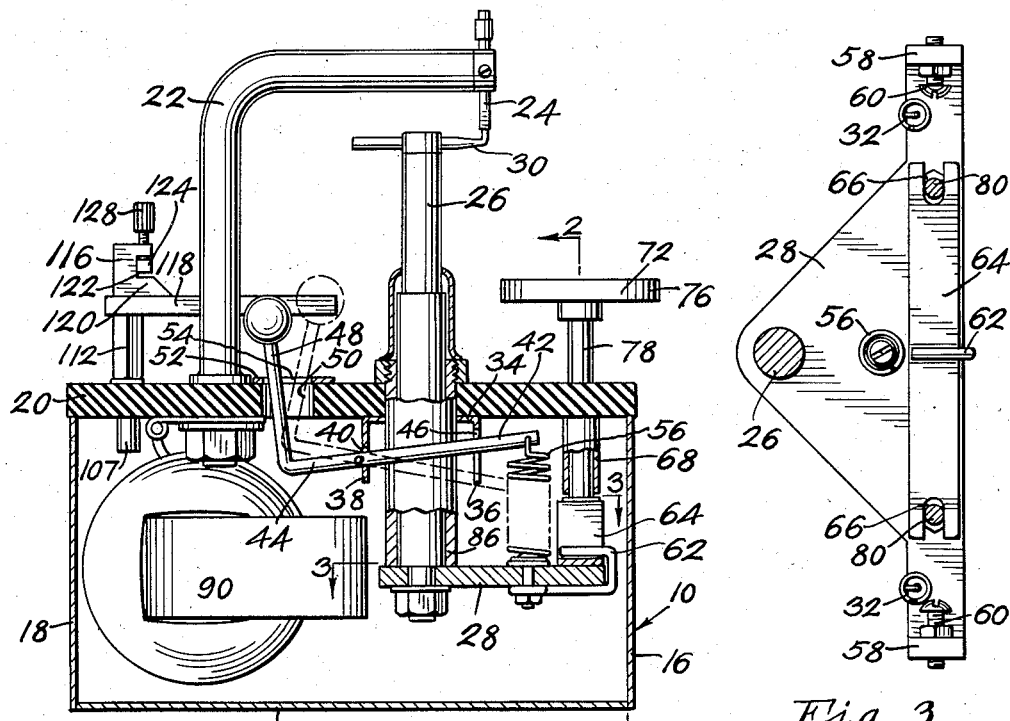
Fig. 1.
Fig. 3.
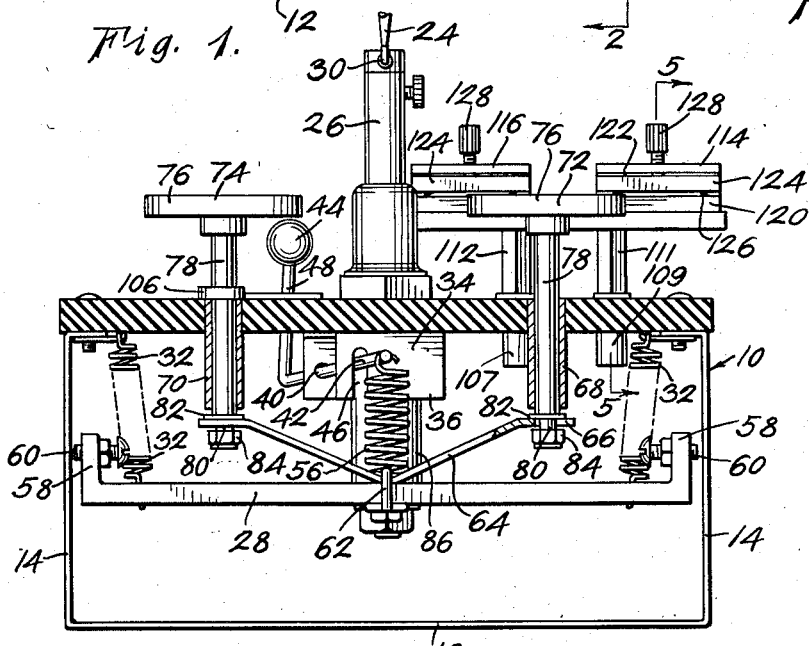
Fig. 2.
INVENTOR.
THAYER R. BRUNSON
BY
Philip H. Sheridan
ATTORNEY July 15, 1958     T. R. BRUNSON     2,843,723
WELDING APPARATUS Filed Nov. 5, 1956     2 Sheets-Sheet 2

INVENTOR.
THAYER R. BRUNSON
BY
Philip H. Sheridan
ATTORNEY

United States Patent Office 2,843,723
Patented July 15, 1958

2,843,723
WELDING APPARATUS

Thayer R. Brunson, Denver, Colo., assignor to Rocky Mountain Metal Products Co., Denver, Colo., a corporation of Colorado Application November 5, 1956, Serial No. 620,243

10 Claims. (Cl. 219—86)

This invention relates to welding apparatus especially suited for use in fabricating orthodontic appliances.

One of the most difficult and troublesome problems attendant to the assembling and welding of orthodontic appliances is the precise arrangement of the minute parts into an assembled relation between the electrodes prior to the actual welding operation. The parts are usually tiny, non-uniform and hard to handle, thus requiring both hands to arrange them properly. Therefore, a welding machine that would provide means for adjusting the position of the electrodes relative to the appliance while leaving both hands free to arrange the parts in the correct relation would constitute a substantial improvement over the prior art orthodontic welders.

In addition, an improved spot welding machine should provide means for quickly adjusting the spring tension acting to force the electrodes into contacting relation as the heavier attachments are preferably welded, using greater electrode pressure than that normally required and it is this pressure between the electrodes that holds the parts of the appliance together while being welded. Also in certain instances it is advisable to vary the size of the weld by controlling the time of the welding impulse. However, this usually requires a complex and expensive timing circuit that is difficult to justify. Therefore, a simple electrical circuit that includes means for varying the duration of the welding impulse without requiring a complicated timing device would be of considerable importance.

Further, a versatile welding unit should provide means for closing the electrical circuit for extended periods, rather than instantaneously, so that soldering and annealing operations could be performed on an appliance. Finally, an all purpose orthodontic welder should include a device in which an arch or other appliance could be clamped for heat treatment to eliminate bending stresses and the like.

It is, therefore, the principal object of the present invention to provide a spot welding machine in which two hand rest levers are provided that can be used either separately or together to steady the hands and adjust the electrodes, while leaving the fingers of both hands free to arrange the parts of the appliance preparatory to welding them together.

A second object of the invention is to provide in apparatus of the type described in the preceding paragraph means permitting rotation of the hand rest levers during positioning of the parts of the appliance.

A third object of the invention is to provide a simple shift device for adjusting the pressure between the electrodes.

A fourth object is to provide a simple impulse switch in the electrical welding circuit that can be actuated in a manner to give a wide variation in the size of the weld produced, thus eliminating the need for complicated timing circuits.

Another object of the instant invention is to provide a switch for energizing the welding circuit for the extended periods required to solder and anneal the appliances.

An additional object is to provide an attachment to the basic welding machine that is used to clamp and heat treat arches and the like with current supplied by the welding circuit.

Further objects of the invention are to provide a welding machine that is simple, relatively inexpensive, compact, lightweight and decorative in appearance.

The construction designed to carry out the invention will be hereinafter described, together with other features thereof, and will be more readily understood from a reading of the following specification and by reference to the accompanying drawings forming a part thereof and wherein an example of the invention is shown, and wherein:

Figure 1 is a view illustrating the welding machine of the present invention by a section taken along line 1—1 of Figure 4, portions thereof having been broken away to better show the construction;

Figure 2 is a section taken along line 2—2 of Figure 1;

Figure 3 is a section taken along line 3—3 of Figure 1;

Figure 4:
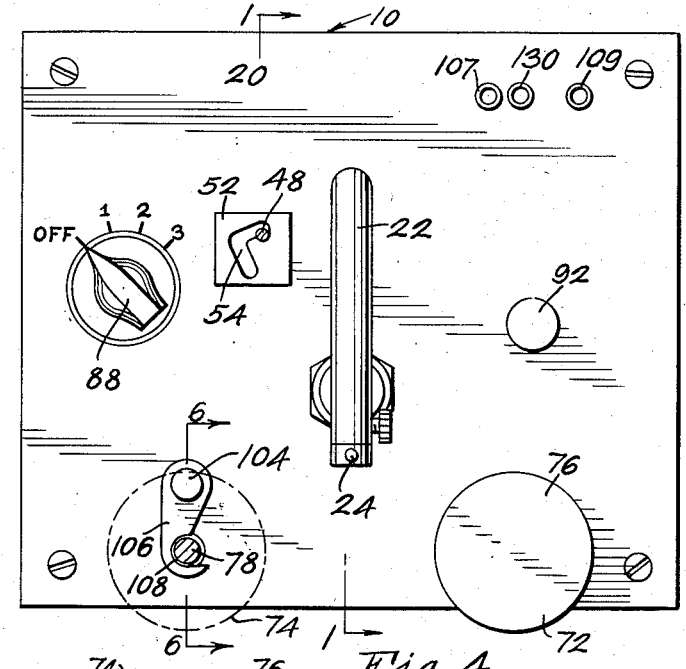
Figure 4 is a top plan view of the welding machine with the left hand rest knob and shift knob removed.

Referring now to the drawing, the electric welding machine of the present invention will be seen to include a case, indicated in a general way by numeral 10, having a bottom 12, side walls 14, a detachable front wall 16, a rear wall 18 and a top 20 formed of an insulating material. A fixed electrode post 22 is attached to the top 20 of the case and extends upwardly and forwardly therefrom. The free end of the fixed electrode post is provided with an electrode 24 which is preferably detachable to permit interchange with the several different types of electrodes in common use for welding and soldering orthodontic appliances. The inverted L-shape of fixed post 22 provides sufficient room for placing even the largest appliance beneath electrode 24.

Movable electrode post 26 is mounted on plate 28 for upward and downward reciprocal movement through the top 20. The upper end of the movable electrode post 26 carries an electrode 30 arranged in opposed relation to electrode 24 on the fixed post. Tension springs 32 are connected between plate 28 and top 20, thus urging the electrodes into contacting relation. Also, springs 32 maintain a constant pressure between these electrodes that acts to hold the parts of the appliance being welded together.

In some instances, however, it is desirable to increase the pressure between the electrodes as in welding extra heavy appliances. This increase in pressure is accomplished through the novel gear shift arrangement which will now be described. A bracket 34 having spaced front and rear flanges 36 and 38, respectively, is attached to the under side of the top 20. Rear flange 38 is provided with an opening 40 that receives arm 42 of L-shaped shift lever 44 and forms a fulcrum. Front flange 38 contains a slot 46 that forms a guide for the forward portion of arm 42. The other arm 48 of the shift lever extends upwardly through an opening 50 in top 20 that is covered by a guide plate 52 containing an L-shaped aperture 54, the extremities of which correspond to the operative and inoperative positions of the shift lever, the rear position being the operative one. The forward or free end of arm 42 is attached to tension spring 56 that is also connected to plate 28. Now, the rear or operative position of the shift lever shown in Figures 2, 4 and 7 and in full lines in Figure 1, causes arm 42 to pivot about fulcrum 40 in the rear flange 38 of bracket 34, thus raising the free end and tensioning spring 56. Of course, this tensioning of spring 56 combines with the action of springs 32 to place the electrodes under additional pressure. The dotted line position of Figure 1 illustrates the inoperative or released position of the shift lever and associated parts.

Perhaps the singlemost important feature of the present invention, however, is the hand rest mechanism which controls the movement of the movable electrode post 26 and the electrode 30 carried thereby in relation to the fixed electrode post 22 so that the parts of the appliance to be welded may be placed and positioned therebetween. Reference will now be had in particular to Figures 1, 2, 3 and 7 for an explanation and description of this mechanism.

Plate 28 is provided with upturned flanges 58 on opposite sides. Bolts 60 are threaded through each of these flanges and act to maintain the plate in the desired relation with respect to the remaining elements of the hand rest assembly as they slide along the side walls 14 of the case. The front center of the plate 28 is provided with a fulcrum 62 beneath which V-shaped lever arm 64 is mounted for rockable movement about its center, as shown. The lever arm 64 contains notches 66 at each end as shown in Figures 2 and 3.

Two sleeves 68 and 70 are attached through top 20 forward and on opposite sides of the movable electrode post 26. These sleeves terminate on the surface of the top but project beneath it into the interior of the case in spaced substantially parallel relation. Their position relative to the electrodes is approximately that occupied by the heels of both hands when placing an appliance to be welded between the electrodes. Sleeve 68 is positioned to the right of the electrodes when viewed as in Figures 2 and 7, and sleeve 70 is to the left. Right and left hand rest levers, 72 and 74 respectively, are mounted in sleeves 68 and 70 for up and down reciprocal movement. Both hand rest levers include a hand rest platform 76, a supporting shaft 78 having a section of reduced diameter 80 located at the lower end, a washer 82 and a nut 84 threaded onto the section of reduced diameter.

The notched ends 66 of the rocker arm 64 receive the sections of reduced diameter 80 of the hand rest levers between the nut 84 and washer 82. The tension springs 32 and 56 maintain the hand rest levers in the normally elevated position above the top 20 as shown in Figures 1 and 2. The upward movement of the hand rest assembly is limited by sleeve 86 in which the movable electrode post 26 reciprocates.

Figure 7:
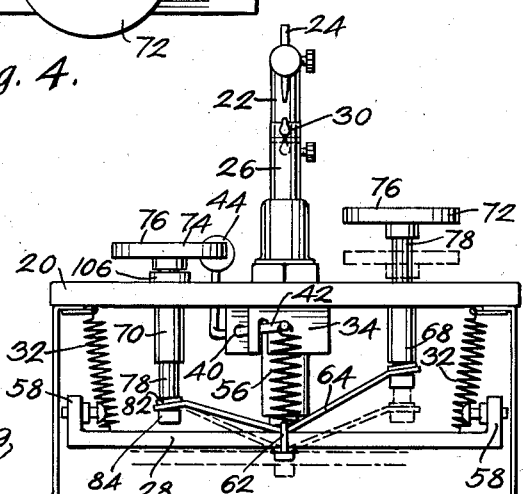
Figure 7 is a front elevation with the cover plate removed.

Referring now in particular to Figure 7 of the drawing, the manner in which the hand rest assembly functions to control the movement of electrode 30 in relation to electrode 24 will now be described. At this point it should be mentioned that both hand rest levers rotate freely within their sleeves, as well as reciprocate, and this is advantageous to the operator in positioning the parts to be welded. When only the left hand rest lever 74 is depressed, as shown in full lines in Figure 7, sleeve 68 of the right hand rest lever acts as a stop for the right end of the rocker arm which pivots about fulcrum 62 and depresses the plate against the action of the tension springs. This, of course, pulls down on the movable electrode post 26 that is also attached to the plate and lowers it away from the fixed post 22. The length of the sections 80 of reduced diameter in relation to the thickness of the rocker arm is such that some lost motion exists when the hand rest levers are depressed before the electrodes separate. The electrodes assume the spacing shown in full lines when the left hand rest lever is pressed all the way down and the same is true when the right hand rest lever is depressed into the dotted line position if the left hand rest lever is not depressed. When maximum electrode separation is required, however, both hand rest levers are depressed simultaneously, resulting in twice the movement of the movable electrode post as the rocker arm functions merely as a link between the hand rest levers and plate. Maximum movement of the plate is indicated by dotted lines in Figure 7 as well as the ultimate position of the rocker arm.

In actual operation, these hand rest levers are depressed with the heels of the operator's hands, while the fingers of both hands are left free to manipulate the parts of the appliance being welded. From the foregoing it will be apparent that either hand may be left entirely free while the other is being used to separate the electrodes. Also, both hands are steadied and may turn on the hand rest platforms. Once the parts of the appliance have been placed in the proper assembled relation on the movable electrode for welding, release of the depressed hand rest lever will press the parts together between the electrodes, due to the action of the tension springs, and maintain this relation while welding.

Figure 8:
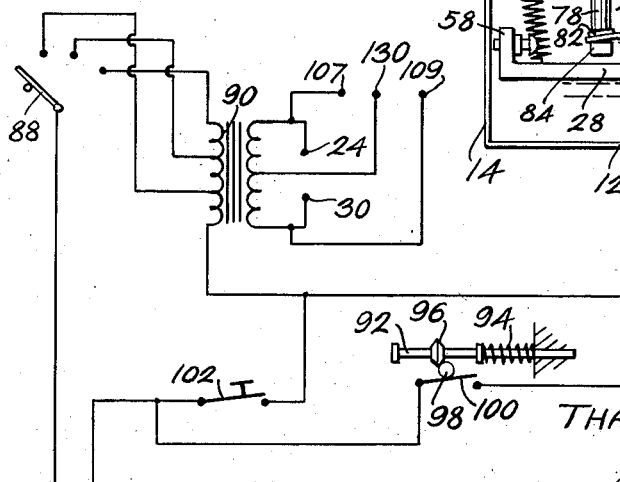
Figure 8 is a circuit diagram illustrating the combined welding, soldering and heat treating circuit.

Attention is now directed to Figure 8 wherein the electrical circuit is illustrated. A control switch 88 on the top 20 regulates the turns being tapped in transformer 90 and controls the welding temperature in a manner well known to the art. The duration of the spot welding impulse is controlled in a simple, but effective manner by switch 92 which has been illustrated somewhat diagrammatically. Control switch 88 and switch 92 are connected in series with the primary of the transformer, as shown. Electrodes 24 and 30 are connected across the secondary of the transformer and are momentarily heated when switch 92 is depressed against the action of the compression spring 94, causing annular rib 96 of the switch element to roll over ball 98 which forces spring contact 100 closed. The electrodes are again energized when the switch is released in the same manner. Sufficient control over the duration of the spot welding impulse is obtained by merely varying the speed with which switch 92 is depressed and released.

Figure 6:
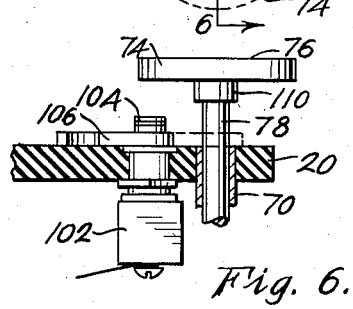
Figure 6 is a fragmentary section taken along line 6—6 of Figure 4 showing the switch latch beneath the left hand rest knob.

In the fabrication of several orthodontic appliances it is necessary to solder rather than weld the parts together. Thus, it is desirable to include means by which the electrodes may be heated by an electrical impulse of longer duration than that provided by switch 92. In connection with Figures 4, 6 and 8, it will be seen that a second switch 102 is connected in parallel with switch 92. Both switches 92 and 102 are normally open so that when button 104 of switch 102 is closed, the circuit through the electrodes 24 and 30 is closed for as long as necessary to accomplish a soldering operation. Note, however, that switch button 104 is positioned directly beneath the platform 76 of the left hand rest lever 74. Means, therefore, are required to prevent the closing of switch 102 by depressing button 104 with the left hand rest while the electrodes are being touched by the fingers as in setting an appliance for welding. This is accomplished with latch 106 that is pivotally mounted on the top and contains a notch 108 positioned and sized to receive shaft 78 of the left hand rest lever and engage collar 110 carried thereon, thus forming a stop to prevent the platform from contacting the switch button, as shown by full lines in Figure 4 and dotted lines in Figure 6. When soldering, however, switch 102 may be closed by pressing button 104 with the fingers after the latch has been disengaged from the left hand rest shaft as shown by full lines in Figure 6.

Figure 5:
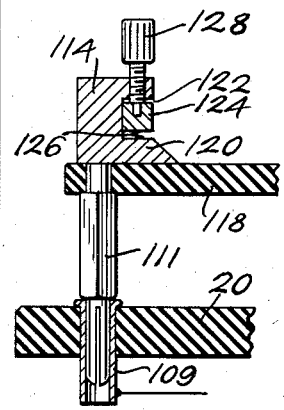
Figure 5 is a fragmentary section to an enlarged scale taken along line 5—5 of Figure 2 illustrating the heat treating attachment.

Another important feature of the invention is the provision of a novel heat treating accessory that is detachably connected into tops 107 and 109 across the secondary of the transformer. This heat treating unit is shown in place in Figures 1, 2 and 5. The heat treating unit is used primarily for tempering arch wires and the like and consists of two post contacts 111 and 112 electrically connected with two vise elements 114 and 116 through an insulated plate 118. Each vise element comprises a fixed jaw 120 having a forwardly facing groove 122 therein in which is placed a movable jaw 124 supported on compression springs 126. A screw member 128 is threaded through the fixed jaw into the movable jaw as shown. Opposite ends of an arch wire (not shown) are merely gripped between the fixed and movable jaws and tempered by closing switch 102 with the left hand rest lever when the latch has been disengaged. Of course, as the left hand rest lever is depressed, electrodes 24 and 30 separate so that they will not become hot.

The remaining contact 130 connected into the middle of the secondary is used with contact 108 to heat up another accessory known as an annealing jack that has not been illustrated but which is clearly described in U. S. Patent No. 2,009,647.

From the foregoing description of the many useful and novel features of the welding machine of the present invention it will be seen that the several objects for which it was designed have been achieved. It is to be understood that certain modifications in the specific machine and apparatus illustrated in the accompanying drawing may be made by those skilled in the art without departing from the true scope of the invention as set forth in the appended claims.

What is claimed is:

1. In a welding apparatus a fixed post, a movable post, an electrode on each post arranged in opposed relation, pressure means normally holding the electrodes in engagement, and means for moving the electrodes into and out of engagement, said means comprising two spaced hand rest levers and a rocker arm interconnecting the hand rest levers with one another and with the movable post, the rocker arm being operative to effect separation of the electrodes upon both joint and independent movement of the hand rest levers.

2. A welding apparatus in accordance with claim 1 in which both hand rest levers are mounted for rotational movement relative to the electrodes.

3. Welding apparatus in accordance with claim 1 in which maximum joint movement of the hand rest levers is operative to effect substantially twice the electrode separation brought about by maximum movement of either hand rest alone.

4. Welding apparatus in accordance with claim 1 in which a lost motion connection is provided between the rocker arm and the hand rest levers to permit limited movement of the hand rest levers before the electrodes separate.

5. In a welding apparatus a fixed post, a movable post, an electrode on each post arranged in opposed relation, pressure means normally holding the electrodes in engagement, and means for increasing the pressure between the electrodes, said means comprising a tension spring operatively associated with the movable post and a lever operatively connected to the spring for increasing the tension therein.

6. A welding apparatus comprising a supporting plate, a fixed post mounted on the supporting plate, a movable post mounted on the supporting plate for reciprocal movement, an electrode carried by each post arranged in opposed relation, a movable plate attached to the movable post for reciprocal movement relative to the supporting plate, tension springs interconnecting the supporting plate and movable plate urging the electrodes into contacting relation, two hand rest levers mounted in the supporting plate in spaced relation for reciprocal movement adjacent the electrodes, an arm interconnecting the hand rest levers and operatively attached to the movable plate for rockable movement about a fulcrum between the ends, the hand rest lever and arm forming means for reciprocating the movable plate and post to move the electrodes into and out of engagement upon both joint and independent reciprocal movement of said hand rest levers.

7. A device in accordance with claim 6 in which the hand rest levers are connected to the arm and supporting plate for rotational movement relative to the electrodes.

8. A device in accordance with claim 6 in which one hand rest lever forms a stop against which the arm rests while the other hand rest lever is reciprocated to separate the electrodes.

9. A device in accordance with claim 6 in which the arm and hand rest levers are connected to form a lost motion connection that will permit limited reciprocal movement of said hand rest levers before the electrodes will separate.

10. A device in accordance with claim 6 in which means are provided for increasing the normal spring tension urging the electrodes into contacting relation, said means comprising a shift lever mounted for pivotal movement relative to the movable plate and a tension spring interconnecting said shift lever with said plate, pivotal movement of said lever acting to place said spring under tension.

References Cited in the file of this patent
UNITED STATES PATENTS 2,448,865     Crombach _____ Sept. 7, 1948
2,772,345     Gainsforth _____ Nov. 27, 1956